United States Patent

Anichini

[11] 3,996,669
[45] Dec. 14, 1976

[54] WIDE-RANGE DEVICE FOR MEASURING THE LINEAR SIZES OF MECHANICAL WORKPIECES

[75] Inventor: Cesare Anichini, Florence, Italy

[73] Assignee: Finike Italiana Marposs-Soc. In Accomandita Semplice di Mario Possati & C., Bentivoglio, Italy

[22] Filed: June 12, 1975

[21] Appl. No.: 586,379

Related U.S. Application Data

[63] Continuation of Ser. No. 419,251, Nov. 27, 1973, abandoned.

[30] Foreign Application Priority Data

Dec. 1, 1972  Italy .................. 3606/72

[52] U.S. Cl. .................. 33/172 E; 33/125 C; 33/147 N
[51] Int. Cl.² .................. G01B 7/02
[58] Field of Search ......... 33/125 C, 143 L, 147 N, 33/148 H, 172 E

[56] References Cited
UNITED STATES PATENTS

| | | | |
|---|---|---|---|
| 2,293,502 | 8/1942 | Hermann | 33/172 E |
| 2,814,120 | 11/1957 | Fogiel | 33/147 N |
| 3,276,131 | 10/1966 | Hahn | 33/147 N |
| 3,293,759 | 12/1966 | Mac et al. | 33/172 E |
| 3,471,934 | 10/1969 | Miller et al. | 33/172 E |

FOREIGN PATENTS OR APPLICATIONS

| | | | |
|---|---|---|---|
| 1,293,500 | 4/1969 | Germany | 33/125 C |
| 191,413 | 9/1964 | Sweden | 33/125 C |

Primary Examiner—Richard E. Aegerter
Assistant Examiner—Richard R. Stearns
Attorney, Agent, or Firm—Stevens, Davis, Miller & Mosher

[57] ABSTRACT

A wide-range device for measuring the sizes of mechanical pieces which includes at least one measuring head, a support for said at least one measuring head with a narrow-range measuring transducer, a D.C. motor, a position transducer with reciprocally moving elements having a scale with equidistant reference positions, a position servo-system to position a reference element integral with the measuring head in correspondence with one of the reference positions of the scale, a reader connected to the measuring head to indicate the measure in intervals comprised between the reference positions of the scale and circuits to control the motor.

10 Claims, 6 Drawing Figures

WIDE-RANGE DEVICE FOR MEASURING THE LINEAR SIZES OF MECHANICAL WORKPIECES

This is a continuation of application Ser. No 419,251, now abandoned, filed Nov. 27, 1973.

The present invention relates to a wide-range device particularly fitted for gauging diameters and other linear sizes of mechanical pieces during their machining on machine-tools, such as grinders, or in bench checks.

For several years the mechanical industry has been using some gauges which are called "in process" for checking the sizes of mechanical pieces during their machining on grinders or other machine-tools. These gauges are generally mechanical comparators, or ones fitted with transducers of a pneumatic, electronic or different type, which measure deviations with respect to pre-set sizes (such deviations being measured, for instance, in hundredths and/or thousandths of millimeter).

The use of comparators entails the carrying out of mechanical and electrical "zero-setting" adjustments, when it is necessary to pass from a reference size to another size. These adjustments are very delicate and on the whole require some few minutes in time.

On the other hand machine-tools have been improved to such an extent that the real machining cycles often take a few seconds. Therefore it is clear that when numerous parts of a piece with different sizes or, on the contrary, small sets of pieces are machined on the same machine-tool, in the first case it is necessary to use as many comparators as the number of parts of the workpiece to be gauged, and in the second case to carry out the zero-setting for each set of pieces. The same is true of bench checks.

In order to avoid these technical and economic inconveniences it was tried to make zero-setting operations automatic, by means of motors, position transducers and servo-controls adapted to quickly and accurately displace the measuring heads of comparators to any needed position along mechanical guides. However, the devices made according to these principles did not find any industrial applications and they are still but laboratory prototypes. As a matter of fact, to carry out such positioning operations with a precision within the order of magnitude of 1 micron or less requires very complex control and processing circuits, comparable with electronic computers, which are very sensitive to disturbances and have an insufficient repeatability, besides being very expensive.

Some wide-range gauges also were developed based on the use of particular transducers formed by reciprocally moving elements having considerable ranges. They are called "absolute gauges" since they carry out real size measurements through said transducers instead of deviation measurements with respect to nominal sizes.

Absolute gauges, too, have not found any practical use in industry up to now, for the same reasons mentioned above and for their excessive bulk, the large sizes of the masses of moving organs and the delicacy of structures and materials, which render them unfit for use to gauge workpieces being machined on machine-tools.

The object of the present invention is to provide a wide-range gauge endowed with such precision, quickness and safety as to be effectively used for gauging a wide variety of sizes, on a machine-tool or on a bench, which contemporarily does not require zero-setting operations on master pieces.

Another aim of the present invention is to provide a wide-range gauge adapted to be used to gauge pieces with discontinuous surfaces and pieces moving at high speeds.

A further object of the present invention is to make a relatively inexpensive but profitable wide-range gauge.

Such goals and advantages of the present invention will result from the following description of a wide-range measuring device, comprising supporting means for at least one narrow-range measuring head, and driving and positioning means with a position transducer having reciprocally moving elements to displace the supporting means along mechanical guides and in which the positioning means includes circuits to control the driving means by error signals for positioning the reciprocally moving elements in correspondence with reference positions. The reference positions locate wide subdivisions of the measuring range. The measuring head includes indicating means to indicate the measure within the intervals included between the adjacent reference positions of the reciprocally moving elements.

According to a preferred embodiment, the device comprises a scale with equidistant reference positions, position servo-system means to position a reference element integral with the measuring head in correspondence with one of the reference positions of the scale, circuits connected with the measuring head to control said driving means, and reading means which are also connected with the measuring head to detect the measure in the intervals included between the reference positions of the scale.

The present invention will be described in more detail with respect to the embodiments shown in the accompanying drawings given by way of non-limiting example, in which equal or equivalent parts are marked by the same reference numerals and in which.

Figure 2:
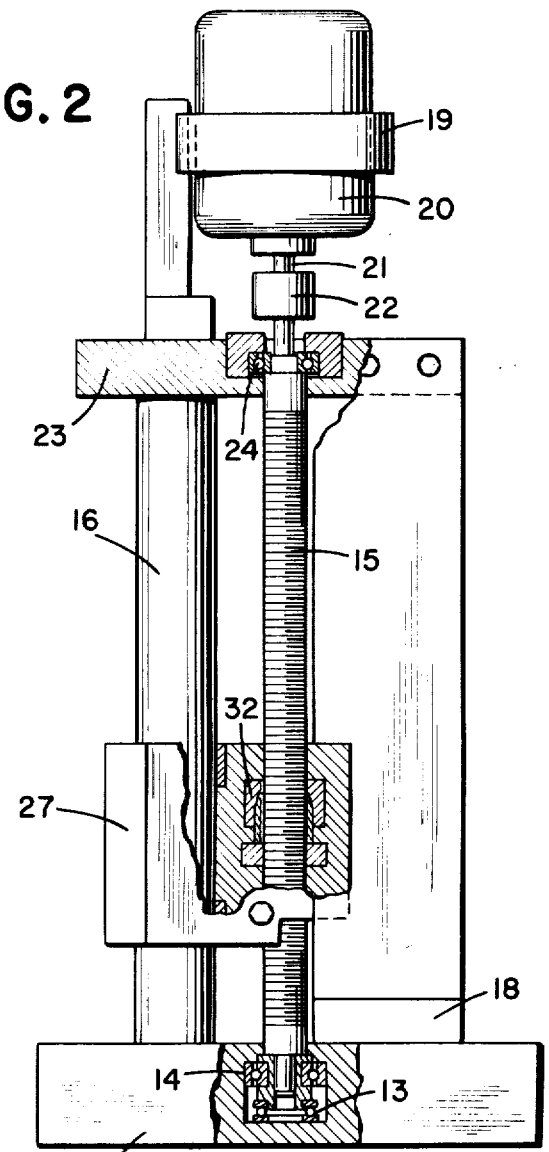
FIG. 2 is a partial back elevational view, with some sectioned details, of the measuring device of FIG. 1.
Figure 1:
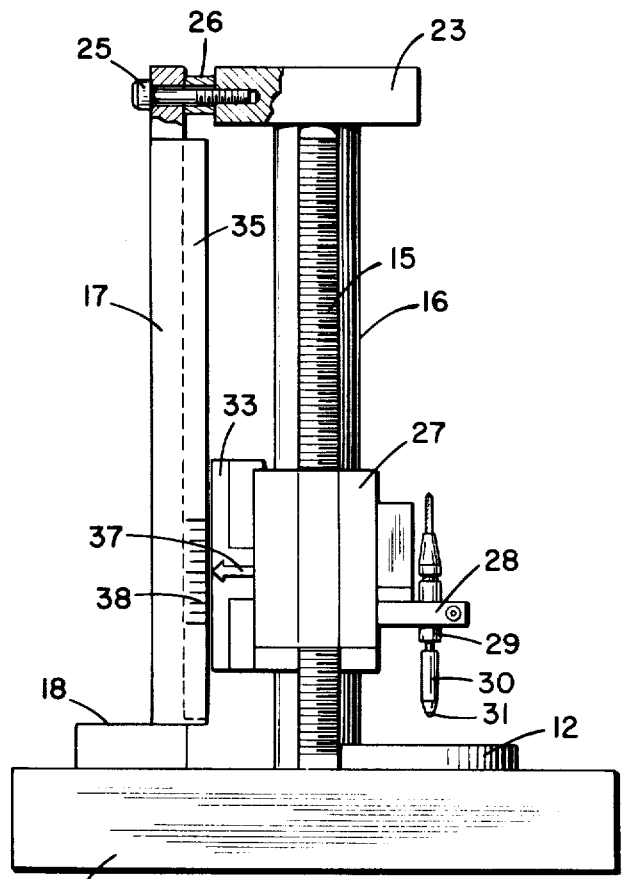
FIG. 1 shows a partial side elevational view, with some sectioned details, of a wide-range measuring device adapted for the bench checking of mechanical pieces.
Figure 3:
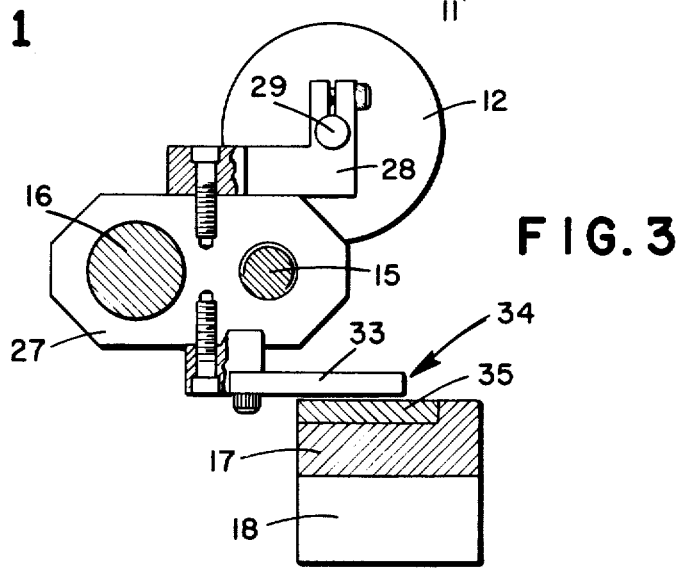
FIG. 3 is a partial plan sectional view of the measuring device of FIGS. 1 and 2.

With reference to FIGS. 1 to 3 the measuring device comprises a base 11 on which there is a circular plate 12 bearing the pieces to be measured.

Base 11 supports a vertical shaft 15, threaded in its intermediate part, through an axial bearing 13 and a radial bearing 14.

Furthermore base 11 supports a cylindrical vertical column 16 and a stanchion 17 associated with a base 18. By means of a flange 19 cylindrical column 16 supports a D.C. motor 20 with a vertical shaft 21 (FIG. 2).

Shaft 21 is connected with the threaded shaft 15 by an elastic joint 22.

A horizontal plate 23 surrounds cylindrical column 16 and shaft 15, which is lodged in a radial bearing 24 mounted on a seat of the same plate 23.

The upper end of stanchion 17 is connected with plate 23 through screws 25 and spacing elements 26.

By means of an arm 28 a slide 27 supports a measuring head 29 comprising an axially moving vertical shaft 30 and a feeler 31.

Slide 27 is movable in a vertical direction guided by cylindrical column 16.

Slide 27 is operated as a result of the rotations of shaft 15 due to the connection of the thread of the same shaft 15 with a nut screw 32 associated with slide 27.

With slide 27 there is moreover integral therewith slider 33 of a position transducer 34 having a graduated scale 35 bound with stanchion 17.

Figure 4:
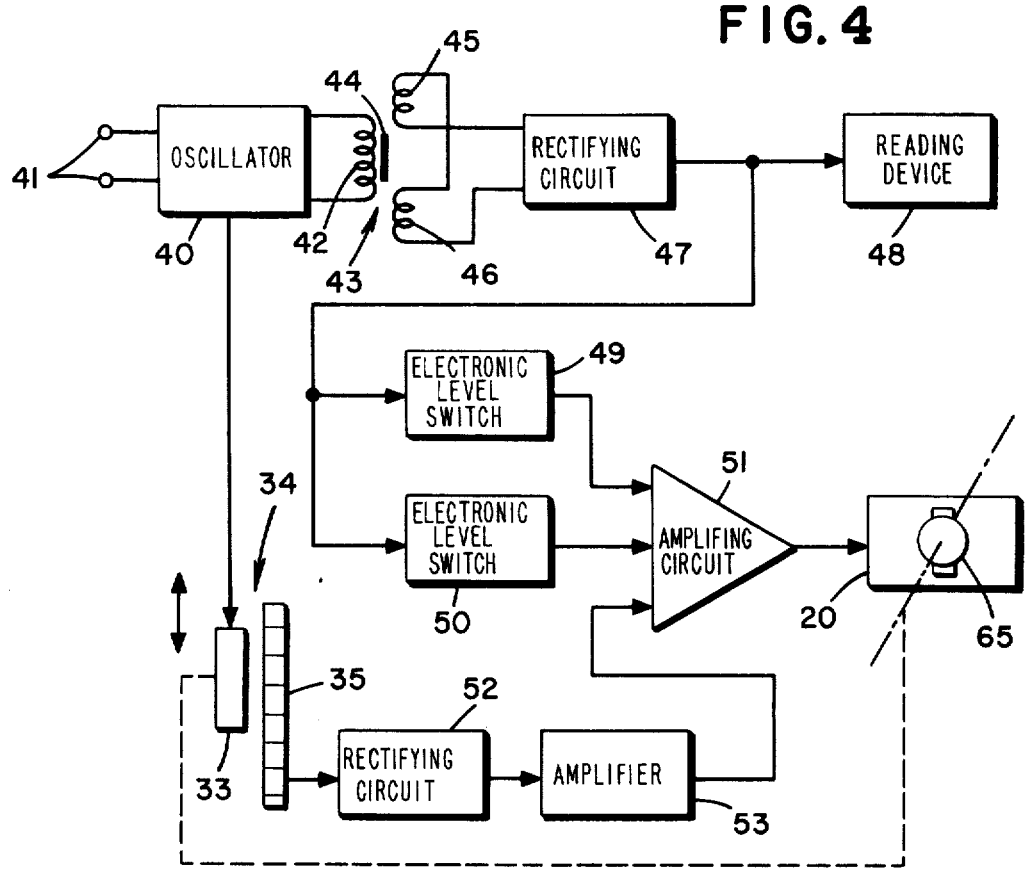
FIG. 4 is a block diagram of the electrical circuits of the device of FIGS. 1 to 3.
Figure 5:
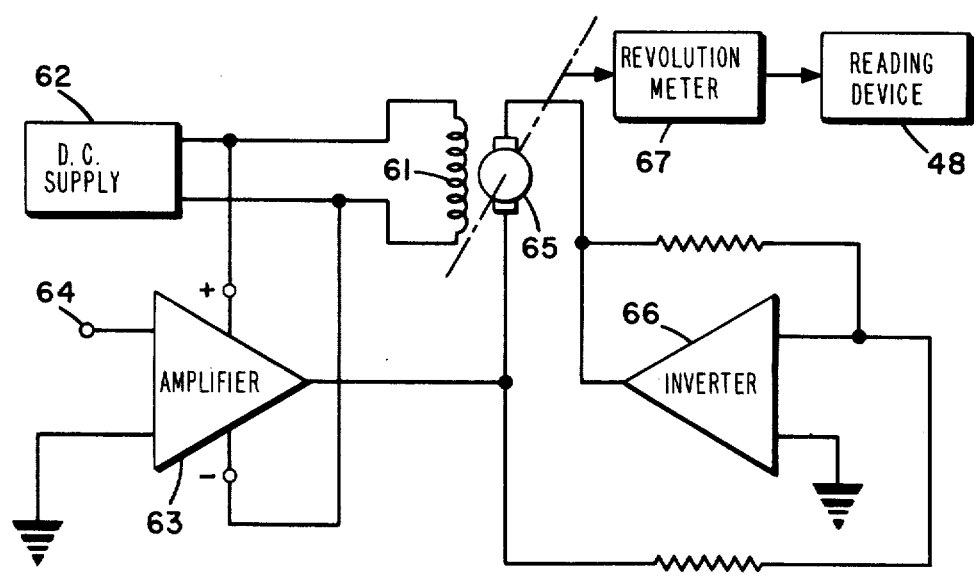
FIG. 5 is a more detailed block diagram of some details of the electric circuits of FIG. 4.

The electric control circuits shown in FIGS. 4 and 5 describe an oscillator 40, fed at the input terminals 41, and connected at the output with the primary coil 42 of a differential transformer 43 representing the position transducer of measuring head 29.

Furthermore differential transformer 43 includes a core 44 connected with shaft 30 (FIG. 1) and hence moving with it and two series-connected but phase-opposed secondary coils 45, 46.

The output of differential transformer 43 is connected with a rectifying circuit 47.

The rectifying circuit 47 supplies a rectified voltage having an amplitude depending on the position of core 44.

The amplitude varies symmetrically with respect to zero which is achieved when core 44 lies in a central position. The rectified voltage is brought to a reading device 48 and additionally feeds the inputs of two electronic level switches 49, 50, switch 49 of which commutates when reaching a preset positive voltage value and switch 50 when reaching another preset value with a sign opposite in regard to the preceding. Electronic switches 49, 50 are switched off when the input voltage is comprised between the two values; when, on the contrary, the input voltage exceeds the preset positive value or is lower than the preset negative value, switch 49 or switch 50 respectively feeds the input of an amplifying circuit 51 which is saturated.

Moreover, oscillator 40 feeds the input of position transducers 34, i.e., slider 33.

The output of transducer 34 is formed by scale 35. The output signal of transducer 34, rectified by rectifying circuit 52 and amplified by amplifier 53, is brought to the input of amplifying circuit 51, whose output is connected with motor 20.

Motor 20 (FIG. 5) is provided with an excitation winding 61 fed by a D.C. supply 62 which also provides the biasing voltage for an amplifier 63 whose input terminal is indicated by reference 64.

The output voltage of amplifier 63 is transmitted to one of the brushes of rotor 65 of motor 20 and to the input of an inverter 66 whose output is connected with the other brush of rotor 65.

With the rotor 65 there is associated a revolution meter 67 connected to the reading device 48.

The elements indicated in FIG. 5 by the references 61–66 form part of amplifying circuit 51 and motor 20 of FIG. 4. The measuring device works as follows.

It is assumed that slide 27 lies in correspondence with the upper end of threaded shaft 15 and that feeler 31 does not touch the workpiece to be measured.

In such a case vertical shaft 30 and core 44 are displaced downwardly.

The output voltage of rectifying circuit 47 makes electronic level switch 50 conduct, which feeds amplifier 51.

Rotor 65 revolves in one direction causing the lowering of slide 27, which goes on descending until feeler 31 touches the piece.

After this contact, shaft 30 moves upwardly, the voltage at the output of rectifying circuit 47 varies until it reaches the interval comprised between the preset values mentioned above.

Under such conditions motor 20 is fed by the output signal of position transducer 34 which controls the positioning of slide 27 to the nearest reference graduation of scale 35. This positioning occurs with the highest accuracy as transducer 34 forms part of a feedback circuit, giving an error signal which, amplified by amplifying circuit 51, rotates rotor 65 till the error signal reaches the value "zero".

To this reached position there corresponds a dimension which is visualized (for example in millimeters) by meter 67 and reading device 48.

The dimension can also be directly read by observing the position of reference 37 associated with slider 33 in regard to some graduations 38 obtained on scale 35 or on a straight edge linked with the scale (FIG. 1).

If the piece dimensions exactly correspond to said dimension, core 44 of transducer 43 lies in a central position.

Otherwise the positive or negative dimensional difference is measured by head 29 and visualized on reading device 48, which receives this further information from rectifying circuit 47.

It is clear that if shaft 30, on the contrary, is pushed upwardly until it causes electronic level switch 49 to conduct, shaft 15 will revolve in a direction opposite to the preceding rotation, causing the elevation of slide 27 which goes on ascending till the output signal of rectifier 47 comes into the abovementioned interval.

Therefore, by means of a position servo-system comprising transducer 34, the measuring device according to the present invention carries out the positioning of slide 27 with measuring head 29 in correspondence with equidistant reference graduations of scale 35 locating broad but very exact subdivisions of the measuring range.

In the intervals comprised between said reference graduations the size gauging is achieved by transducer 43 of head 29. Transducer 34 controlling the positioning of slide 27 and therefore of head 29 can be of different types. As a matter of fact there are on the market various position transducers (e.g. of an electronic, electro-magnetic, optical type) supplying, dependent on the mutual displacements between a moving and a fixed element, an output signal which recurs cyclically according to the position and is adapted to be used in the formerly described servo-system.

It is also possible to use transducers having elements reciprocally moving with a rotary motion, instead of linearly. For this purpose it suffices to make use of suitable connections, for instance with a rack-and-pinion precision system or with equivalent systems.

These per se known position transducers also can be made so that they can give stop signals for positioning in positions very close to each other, i.e., with intervals of 1 micron or less, along a scale.

In such a case, however, they need extremely complex and delicate processing and control circuits which are unnecessary in the device according to the present invention.

In an advantageous embodiment of the device according to the present invention, graduations of scale 35 in correspondence with which slide 27 is positioned are 2 mm apart; head 29 has a measuring range slightly broader than this value.

The formerly described device also can be used, by simple modifications, for measuring pieces during their machining on machine-tools, particularly grinders.

Figure 6:
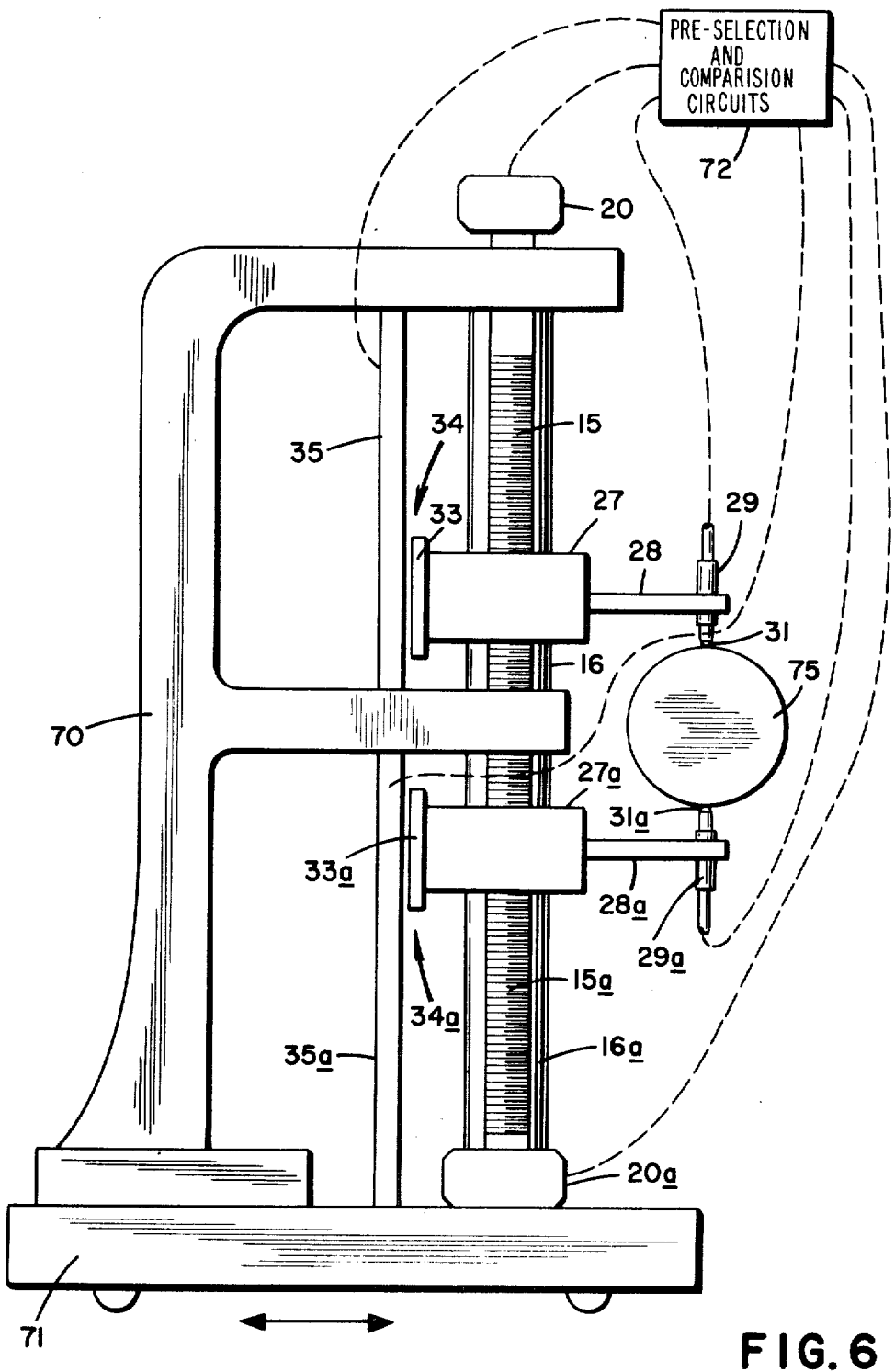
FIG. 6 is a general side elevational view of a wide-range measuring device according to the present invention adapted to gauge mechanical pieces during machining.

With reference to the embodiment schematically shown in FIG. 6, a frame 70 supported by a carriage 71 displaceable so that it can approach and move away from the piece to be measured, sustains threaded shafts 15, 15 a (the former with a right-hand thread and the latter with a left-hand thread) associated with D.C. motors 20, 20 a, scales 35, 35 a of transducers 34, 34 a whose sliders 33, 33 a are integral with slides 27, 27 a; cylindrical columns 16, 16 a serving as guides for slides 27, 27 a. Arms 28, 28 a integral with slides 27, 27 a support narrow-range measuring heads 29, 29 a.

The electric circuits operating motors 20, 20 a are connected to a control and reading group 72.

Group 72 includes pre-selection and comparison circuits through which it is possible to control the positioning of heads 29, 29 a in correspondence with desired reference positions located by transducers 34, 34 a. For instance, if it is required to grind a workpiece 75 until a desired nominal size is obtained, the latter is set on group 72.

Group 72 controls the symmetrical positioning of heads 29, 29 a in correspondence with the reference positions provided by transducers 34, 34 a to which the distance closest to the set nominal size corresponds.

To this end the components described already with reference to FIGS. 4 and 5 can be used. The movement of slides 27, 27 a towards the end positions is controlled by comparing signals provided by revolution meters similar to meter 67 of FIG. 5 with the set size. The exact positioning of the slides is controlled by error signals provided by transducers 34, 34 a.

In particular, these error signals can be formed by the envelope of one of the output voltages provided by transducers of the type sold under the trademark "Inductosyn".

Such transducers provide output voltages with a sinusoidal envelope suitable for carrying out exact positionings by using circuits like that of FIG. 5.

During the grinding, heads 29, 29 a are kept in this position and control the various machining phases.

The end of the grinding operation is automatically controlled when the dimension corresponding to the sum of the signals provided by heads 29, 29 a and of the signals given by transducers 34, 34 a corresponds to the set nominal size. The device according to the present invention also can be used to gauge high-speed moving pieces and pieces with a discontinuous surface on a bench or on a machine-tool.

For this purpose heads 29, 29 a can be made substantially as described in U.S. Pat. No. 3,345,753. It also is possible, in particular for the in-process gauging of pieces with uninterrupted surfaces, to control motors 20, 20 a in a way similar to that described with reference to the device of FIGS. 1–3.

What is claimed is:

1. A wide-range measuring device for measuring the sizes of mechanical workpieces, comprising:
   support means;
   mechanical guide means carried by said support means;
   slide means movable along said guide means;
   measuring head means fixed on said slide means and having distance-measuring transducer means covering a determined measuring range;
   driving and positioning means coupled to said slide means and including:
   motor means;
   transmission means driven by the motor means and coupled to the slide means for displacing the latter in either direction along said guide means;
   position transducer means covering a measuring range wide in comparison with that of said distance measuring transducer means, and comprising reciprocally moving elements fixed to said support means and slide means, respectively, said position transducer means including means for providing error signals upon deviation of the relative position of said moving elements from a number of determined reference positions thereof; and circuit means connected to said position transducer means and to said motor means to feed to the latter said error signals for driving the motor means to position said reciprocally moving elements in correspondence with said reference positions;
   said circuit means including switch means for activating the feeding of said motor means by said error signals when said slide means reaches a position at which the distance measuring transducer means has a predetermined spatial relationship with respect to the workpiece to be measured, when the latter is located in the measuring position with respect to the measuring device; and output means coupled to said measuring head means and said position transducer means for obtaining the size of the workpiece by combination of signals depending on the relative position of said reciprocally moving elements and signals provided by said distance-measuring transducer means.

2. The wide-range measuring device as claimed in claim 1, wherein:
   said mechanical guide means comprises a guide for a linear motion;
   said slide means comprises a first slide and a second slide movable along said guide;
   said measuring head means comprises a first head fixed to one of said slides and a second head fixed to the other slide, each head including a feeler and a distance-measuring transducer; said motor means includes first and second motor means;
   said transmission means comprises a first mechanical transmission for displacing the first slide and a second mechanical transmission for displacing the second slide; said position transducer means includes first and second position transducer means; and said circuit means includes first and second circuit means.

3. The measuring device as claimed in claim 1, wherein:
   said support means comprises a support for the workpiece to be measured;
   said mechanical guide means comprises a guide for a linear motion;
   said slide means comprises a slide movable along said guide towards and away from the workpiece to be measured;
   said measuring head means comprises a measuring head having a feeler coupled with said distance-measuring transducer means;

said motor means comprises an electrical motor;
said transmission means comprises a member coupling the motor to said slide;
said position transducer means comprises a stationary member fixed to said support and a movable member fixed to said slide.

4. The measuring device as claimed in claim 3, wherein said electrical motor is a D.C. motor and said circuit means comprises a circuit for feeding said error signal to an armature circuit of the motor.

5. The measuring device according to claim 3, wherein said transmission means comprises a threaded shaft rotatable by said electrical motor and parallel to said guide, said shaft being threadedly coupled to said slide.

6. The measuring device according to claim 5, wherein said position transducer means comprises a stationary member fixed to said support and a movable member fixed to said slide, and wherein said rotatable shaft is coupled to a revolution meter for indicating the relative position assumed by said stationary and movable members in correspondence of said reference positions.

7. A wide-range measuring device for measuring the sizes of mechanical workpieces, comprising:
mechanical support means;
mechanical guide means carried by said support means; slide means movable along said guide means in either of two directions towards and away from the workpiece to be measured;
measuring head means fixed on said slide means and having distance-measuring transducer means covering a determined measuring range and movable feeler means for contacting the workpiece, the feeler means being coupled to the distance-measuring transducer means; and
driving and positioning means including:
electrical motor means;
mechanical transmission means coupled to the motor means and to the slide means for displacing the latter in either of said directions;
position transducer means comprising stationary means fixed to said support means, movable means fixed to said slide means and electrical circuit means for providing electrical error signals depending on deviations of said movable means from determined reference positions, relative to the stationary means, locating wide subdivisions of the measuring range of the measuring device, said determined measuring range of the distance-measuring transducer means covering at least the interval comprised between two adjacent wide subdivisions; and
circuit means for driving said electrical motor means, including: feeding circuits for feeding the motor means; first connecting circuits for connecting said distance-measuring transducer means to said feeding circuits; second connecting circuits for connecting said electrical circuit means of the position transducer means to said feeding circuits; switch means for activating the feeding of said motor means through said feeding circuits by said error signals when said slide means reaches a position at which said feeler means is displaced by a predetermined amount, the motor means being fed by the distance measuring transducer means — through the feeding circuits — prior to the actuation by said switch means of the feeding of the motor by the error signals, the feeding of the motor means by the distance-measuring transducer means being deactuated by the switch means at the same time the feeding by the error signals is actuated; and output means coupled to said measuring head means and said position transducer means for obtaining the size of the workpiece by combination of signals depending on the relative position of said reciprocally moving elements and signals provided by said distance-measuring transducer means.

8. The wide-range measuring device as claimed in claim 7, wherein:
said support means is movable towards and away from the workpiece to be measured;
said mechanical guide means comprises a guide for a linear motion;
said slide means comprises a first and a second slide movable along said guide;
said measuring head means comprises a first head fixed to one of said slides and a second head fixed to the other slide, each head including a respective distance-measuring transducer;
said electrical motor means comprises two D.C. motors; said mechanical transmission means comprises a first mechanical transmission for coupling one of said D.C. motors to the first slide and a second mechanical transmission for coupling the other D.C. motor to the second slide; said position transducer means includes first and second position transducer means for providing error signals depending on the positions of the slides relative to determined reference positions;
and said circuit means includes first and second circuit means for driving said D.C. motors, respectively.

9. The measuring device as claimed in claim 7, wherein:
said mechanical support means comprises a support for the workpiece to be measured;
said mechanical guide means comprises a guide for a linear motion;
said slide means comprises a slide movable along said guide;
said measuring head means comprises a measuring head having a feeler coupled with said distance-measuring transducer means;
said distance-measuring transducer means comprises a differential transducer which provides an output signal varying symmetrically with respect to a value corresponding to a defined central position of said feeler;
said electrical motor means comprises a D.C. motor; said first connecting circuits comprise a circuit for feeding said symmetrically varying output signal to an armature circuit of said motor to control movement of said slide in either of said two directions;
said second connecting circuits comprise a circuit for feeding said electrical error signals to said armature circuit of the motor to control the position of said slide.

10. The measuring device according to claim 9, wherein said switch means comprises electronic switches inserted between said first connecting circuits and said feeding circuits, said electronic switches being responsive to pre-established levels of the signals they receive from the first connecting circuits for switching-off the feeding circuits from the first connecting circuits and permitting them to be controlled through the second connecting circuits.

* * * * *